US009006935B2

(12) United States Patent
Fukushima

(10) Patent No.: US 9,006,935 B2
(45) Date of Patent: Apr. 14, 2015

(54) WIRELESS POWER FEEDER/RECEIVER AND WIRELESS POWER TRANSMISSION SYSTEM

(75) Inventor: Noriyuki Fukushima, Tokyo (JP)

(73) Assignee: TDK Corporation, Tokyo (JP)

(*) Notice: Subject to any disclaimer, the term of this patent is extended or adjusted under 35 U.S.C. 154(b) by 701 days.

(21) Appl. No.: 13/334,779

(22) Filed: Dec. 22, 2011

(65) Prior Publication Data
US 2012/0248890 A1 Oct. 4, 2012

Related U.S. Application Data

(60) Provisional application No. 61/469,211, filed on Mar. 30, 2011.

(51) Int. Cl.
H02J 5/00 (2006.01)
H02J 7/02 (2006.01)
H02J 17/00 (2006.01)
B60L 11/18 (2006.01)

(52) U.S. Cl.
CPC ............ H02J 5/005 (2013.01); H02J 7/025 (2013.01); H02J 17/00 (2013.01); B60L 11/182 (2013.01); Y02T 10/7005 (2013.01); Y02T 90/14 (2013.01); Y02T 90/122 (2013.01)

(58) Field of Classification Search
CPC ...................................................... H02J 5/005
USPC ....................................................... 307/104
See application file for complete search history.

(56) References Cited

U.S. PATENT DOCUMENTS

| 7,741,734 B2 | 6/2010 | Joannopoulos et al. |
| 2007/0222542 A1 | 9/2007 | Joannopoulos et al. |
| 2010/0148723 A1* | 6/2010 | Cook et al. ............ 320/108 |
| 2010/0270970 A1 | 10/2010 | Toya et al. |
| 2011/0006612 A1 | 1/2011 | Kozakai |
| 2011/0018358 A1 | 1/2011 | Kozakai |
| 2011/0018494 A1 | 1/2011 | Mita |
| 2011/0018495 A1 | 1/2011 | Komiyama |

FOREIGN PATENT DOCUMENTS

| JP | A-2010-158151 | 7/2010 |
| JP | A-2010-183813 | 8/2010 |
| JP | A-2010-263663 | 11/2010 |
| JP | A-2011-19291 | 1/2011 |
| JP | A-2011-29799 | 2/2011 |
| JP | A-2011-30293 | 2/2011 |
| JP | A-2011-30294 | 2/2011 |
| WO | WO 2007/008646 A2 | 1/2007 |

* cited by examiner

Primary Examiner — Rexford Barnie
Assistant Examiner — Daniel Kessie
(74) Attorney, Agent, or Firm — Oliff PLC

(57) ABSTRACT

A wireless power feeder/receiver according to an embodiment of the present invention includes: a power feed/receive coil; a power feed/receive capacitor to configure a resonance circuit together with the power feed/receive coil; a coupling coil electromagnetically coupled to the power feed/receive coil; a power adjustment section performing at least any one of adjustment for AC power to be transmitted from the power feed/receive coil and adjustment for AC power to be received by the power feed/receive coil; a switching section switching connection of the power feed/receive coil, the power feed/receive capacitor, and the coupling coil to the power adjustment section; and a switching control section controlling the switching section.

17 Claims, 12 Drawing Sheets

WIRELESS POWER FEEDER/RECEIVER AND WIRELESS POWER TRANSMISSION SYSTEM

CROSS REFERENCE TO RELATED APPLICATION

This application claims priority to U.S. Provisional Application No. 61/469,211 filed on Mar. 30, 2011 by the same applicant, which is hereby incorporated by reference in its entirety.

BACKGROUND OF THE INVENTION

1. Field of the Invention

The present invention relates to a wireless power feeder/receiver and a wireless power transmission system for performing power transmission by a non-contact method.

2. Related Background Art

Recently, transition to an electric vehicle is promoted for solving environmental problems (e.g., reduction of $CO_2$ emission amount). For expanding use of the electric vehicle, it is desired to realize a secondary battery charging method which is simple and safe and also does not put a burden on a person (e.g., reduction of a burden to connect a relatively heavy charging cable or improvement of safety such as avoidance of electrification and the like). Accordingly, non-contact power feeding utilizing electromagnetic induction or a magnetic field resonance effect which is a kind of magnetic coupling (electromagnetic coupling), is drawing attention.

Further, a house employing a technique of storing natural energy such as solar power into a secondary battery and utilizing the stored energy for solving the environmental problems, is becoming popular. In this case, a secondary battery which has a large storage capacity for sufficiently storing natural energy is required and it is expected to use a secondary battery mounted on an electric vehicle. Also in this case, non-contact power feeding utilizing the electromagnetic induction or the magnetic field resonance effect which is a kind of magnetic coupling (electromagnetic coupling), is drawing attention.

In these cases of non-contact power feeding, it is desired to realize a wireless power feeder/receiver which is capable of easily selecting power feeding from a house as a base station to an electric vehicle or power feeding from the electric vehicle to the base station, that is, capable of easily performing bidirectional power transmission.

Meanwhile, in a wireless power transmission system utilizing the electromagnetic induction, a wireless power feeder is provided with a power feed coil and a wireless power receiver is also provided with a power receive coil, and then power transmission is performed by a non-contact (wireless) method by utilizing the electromagnetic induction between these power feed coil and power receive coil.

Further, in a wireless power transmission system utilizing the magnetic field resonance effect, a wireless power feeder is provided with a power feed resonance circuit having a power feed coil and a power feed capacitor and a wireless power receiver is also provided with a power receive resonance circuit having a power receive coil and a power receive capacitor, and then power transmission is performed by a non-contact (wireless) method utilizing the magnetic field resonance effect between these power feed resonance circuit and power receive resonance circuit. Note that, in this wireless power transmission system, the wireless power feeder may include an excitation coil for supplying power to the power feed resonance circuit and the wireless power receiver also may include a load coil receiving power from the power receive resonance circuit.

A wireless power transmission system utilizing this kind of magnetic field resonance effect is disclosed in International Patent Publication WO/2007/008646.

Further, each of Japanese Patent Application Laid-Open Publication No. 2011-19291 and Japanese Patent Application Laid-Open Publication No. 2010-183813 also discloses a wireless power transmission system utilizing this kind of magnetic field resonance effect.

In the wireless power transmission system disclosed in Japanese Patent Application Laid-Open Publication No. 2011-19291, each of plural wireless power receivers has a switch controlling feeding/non-feeding of AC power from a resonance circuit to a rectification circuit, and power receive timing is controlled for each of the wireless power receivers and power receive priority is changed for each of the wireless power receivers.

Further, the wireless power transmission system disclosed in Japanese Patent Application Laid-Open Publication No. 2010-183813 is a system for feeding power from a base station to an electric vehicle and estimates a positional relationship between the base station and the electric vehicle for efficiently charging a secondary battery mounted on the electric vehicle. Specifically, before performing power feeding from the base station to the electric vehicle, power transmission is performed sequentially to the base station by switching two sets of power receive coil mounted on the electric vehicle from an AC power source for distance measurement mounted on the electric vehicle, distances between a resonance coil on the base station side and the respective resonance coils on the electric vehicle side are estimated, and a positional relationship between the base station and the electric vehicle is estimated from these two estimated distances.

SUMMARY OF THE INVENTION

Meanwhile, as described above, when bidirectional power transmission, that is, power feeding from a base station to an electric vehicle and power feeding from the electric vehicle to the base station, is performed, it is desired to realize a wireless power feeder/receiver which is capable of meeting various power transmission situations.

For example, a base station may be a facility other than a house such as a gas station. In this manner, a power transmission distance and a transmission power magnitude are expected to be different depending on a kind of the base station. Further, not only normal charging but also high-speed charging is expected to be desired. Further, power feeding from a road or the like to an electric vehicle during driving on the road and power transmission between electric vehicles might be performed. In this case, the relative distance and the transmission power magnitude are expected also to be different depending on a vehicle speed.

Accordingly, the present invention aims at providing a wireless power feeder/receiver and a wireless power transmission system which are capable of meeting various power transmission situations.

A wireless power feeder/receiver of the present invention includes: a power feed/receive coil; a power feed/receive capacitor to configure a resonance circuit together with the power feed/receive coil; a coupling coil electromagnetically coupled to the power feed/receive coil; a power adjustment section performing at least any one of adjustment for AC power to be transmitted from the power feed/receive coil and adjustment for AC power to be received by the power feed/ receive coil; a switching section switching connection of the power feed/receive coil, the power feed/receive capacitor, and the coupling coil to the power adjustment section; and a switching control section controlling the switching section.

According to this wireless power feeder/receiver, it is possible to appropriately switch a power feed route for a function as a power feeder and a power receive route for a function as a power receiver by the switching section and the switching control section according to various power transmission situations.

For example, when transmission power is small or when a transmission distance is long, the resonance circuit is configured by the power feed/receive coil and the power feed/receive capacitor and the magnetic field resonance effect is utilized. Further, when the power feed route or the power receive route is configured without utilizing the coupling coil (coupling coil coupled to the power feed coil by the electromagnetic induction is called an excitation coil and coupling coil coupled to the power receive coil by the electromagnetic induction is called a load coil), it is possible to reduce a power feed loss or a power receive loss due to power transmission utilizing the electromagnetic induction between the excitation coil and the resonance circuit or between the resonance circuit and the load coil.

Further, it is possible to utilize the electromagnetic induction without configuring the resonance circuit with the power feed/receive coil and the power feed/receive capacitor. Thereby, it is possible to suppress a loss due to the power feed/receive capacitor.

Further, according to this wireless power feeder/receiver, when the resonance circuit is formed by means of connecting the power feed/receive coil and the power feed/receive capacitor without connecting the power feed/receive coil and the coupling coil to the power adjustment section, this wireless power feeder/receiver can function as a wireless relay device.

Further, this wireless power feeder/receiver can function either as a power feeder or as a power receiver according to the power adjustment section and can realize bidirectional power transmission.

The above switching control section may control the switching section so as to connect the coupling coil to the power adjustment section and also to form the resonance circuit by connecting the power feed/receive coil and the power feed/receive capacitor to each other, may control the switching section so as to connect the power feed/receive coil to the power adjustment section, or may control the switching section so as to form the resonance circuit by connecting the power feed/receive coil and the power feed/receive capacitor to each other without connecting the power feed/receive coil and the coupling coil to the power adjustment section.

Further, the above switching control section may control the switching section so that the power feed/receive coil and the power feed/receive capacitor configure the resonance circuit when connecting the power feed/receive coil to the power adjustment section.

Further, the above switching control section may control the switching section so that the power feed/receive coil and the power feed/receive capacitor do not configure the resonance circuit when connecting the power feed/receive coil to the power adjustment section.

Further, the above switching control section may control the switching section according to a signal from outside. This is preferable for a case in which the power feed route and the power receive route are switched according to user's switching operation as in switching between the normal charging and the high-speed charging, for example.

Further, the above wireless power feeder/receiver may further include a position recognition section recognizing a position of a power feed/receive counterpart and the above switching control section may control the switching section according to the position recognized by the position recognition section. Thereby, the power feed route or power receive route can be switched by the switching control section appropriately and autonomously according to the position of the power feed/receive counterpart, that is, a relative distance to the power feed/receive counterpart.

Further, the above wireless power feeder/receiver may further include a power measurement section measuring feed/receive power and the above switching control section may control the switching section according to the feed/receive power measured by the power measurement section. Thereby, the power feed route or power receive route can be switched by the switching control section appropriately and autonomously according to the feed power or the receive power.

A wireless power transmission system of the present invention includes at least two above-described wireless power feeders/receivers and performs bidirectional power transmission between these wireless power feeders/receivers by a non-contact method.

According to this wireless power transmission system, since the above wireless power feeders/receivers are provided therein, it is possible to switch the power feed route and the power receive route appropriately according to various power transmission situations.

According to the present invention, it is possible to switch the power feed route and the power receive route appropriately according to various power transmission situations.

DESCRIPTION OF THE PREFERRED EMBODIMENTS

Figure 1:
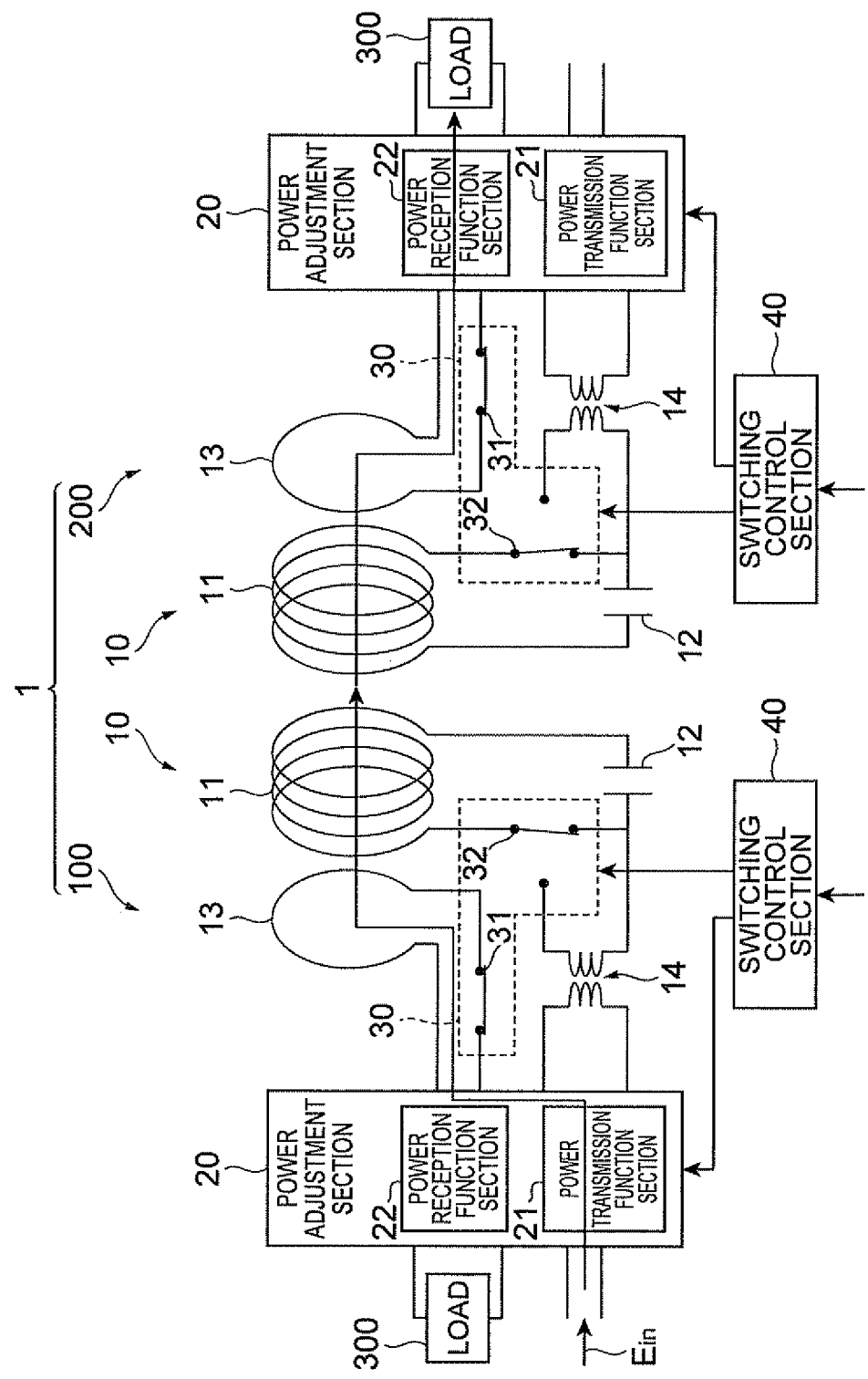
FIG. 1 is a circuit block diagram showing a configuration example of a wireless power transmission system and a wireless power feeder/receiver according to a first embodiment of the present invention.

Hereinafter, preferable embodiments of the present invention will be explained in detail with reference to the drawings. Note that the same or a corresponding part is denoted by the same reference numeral in each of the drawings.

First Embodiment

FIG. 1 is a circuit block diagram showing a configuration example of a wireless power transmission system according to a first embodiment of the present invention. This wireless power transmission system 1 includes a wireless power feeder/receiver 100 installed in a base station provided with power generation equipment (e.g., commercial power equipment, house provided with solar power generation equipment, facility provided with commercial power equipment (e.g., gas station), and road) or in a mobile object provided with electric storage equipment (e.g., electric vehicle (EV) provided with a secondary battery), and also includes a wireless power feeder/receiver 200 installed in a mobile object provided with electric storage equipment (e.g., electric vehicle (EV) provided with a secondary battery), in which bidirectional power transmission is performed by a non-contact method between the wireless power feeders/receivers 100 and 200. The wireless power feeder/receiver 100 and the wireless power feeder/receiver 200 have approximately the same configuration and only the configuration in one of the wireless power feeders/receivers 100 and 200 will be explained in the following.

The wireless power feeder/receiver 100 includes a power feed/receive coil 11, a power feed/receive capacitor 12 for configuring a resonance circuit 10 together with the power feed/receive coil 11, a coupling coil (excitation coil or load coil) 13 electromagnetically coupled to the power feed/receive coil 11, a coupling transformer 14, a power adjustment section 20, a switching section 30, and a switching control section 40. The inductance of the power feed/receive coil 11 and the capacitance of the power feed/receive capacitor 12 are set in a manner such that the resonance frequency of the resonance circuit 10 and the frequency (drive frequency) of AC power from a power transmission function section to be described below approximately coincide with each other.

The power adjustment section 20 includes a power transmission function section 21 and a power reception function section 22. The power transmission function section 21 receives AC power or DC power as input power Ein, adjusts (converts) this power into high frequency AC power, and outputs transmission power for performing power transmission from the power feed/receive coil 11. On the other side, the power reception function section 22 adjusts (converts)/stabilizes (smoothes) high frequency AC power received by the power feed/receive coil 11 and outputs the AC power to a load 300.

Switching between the power transmission function section 21 and the power reception function section 22 is performed according to a control signal from the switching control section 40 by the use of a switching element, for example. Further, the power transmission function section 21 performs adjustment of the magnitude, the frequency, and the like of power transmission according to a control signal from the switching control section 40. Further, the power reception function section 22 performs adjustment of the magnitude of power to be supplied to the load 300 according to a control signal from the switching control section 40.

The switching section 30 includes switching elements 31 and 32. The switching element 31 is disposed between the coupling coil 13 and the power adjustment section 20 and switches connection/non-connection between the coupling coil 13 and the power adjustment section 20. On the other side, the switching element 32 is disposed among the power feed/receive coil 11, power feed/receive capacitor 12, and the power adjustment section 20 and switches connection/non-connection among the power feed/receive coil 11, power feed/receive capacitor 12, and the power adjustment section 20. Specifically, when electrically connecting the power feed/receive coil 11 and the power adjustment section 20 directly to each other, the switching element 32 connects the resonance circuit configured with the power feed/receive coil 11 and the power feed/receive capacitor 12 to the power adjustment section 20. On the other hand, when electrically disconnecting the power feed/receive coil 11 and the power adjustment section 20 from each other, the switching element 32 electrically connects the power feed/receive coil 11 and the power feed/receive capacitor 12 directly to each other so as to form the resonance circuit by the power feed/receive coil 11 and the power feed/receive capacitor 12. A high power relay or a semiconductor switch is used for the switching elements 31 and 31, for example. Note that, while an example in which a switching element is provided only in one line of a parallel wiring is shown in the present embodiment, a switching element may be provided only in the other line of the parallel wiring or switching elements may be provided in both of the lines, respectively.

The switching control section 40 switches power transmission/reception of the power adjustment section 20. Further, the switching control section 40 switches a route in power feeding or power receiving by controlling the switching section 30. In the present embodiment, the switching control section 40 performs each of these kinds of switching according to an external signal corresponding to user's operation.

Next, switching of transmission direction in the bidirectional power transmission and switching of the power feed route in power feeding and the power receive route in power receiving will be explained in detail.

(Switching of Transmission Direction in the Bidirectional Power Transmission)

As shown in FIG. 1, when power transmission is performed from the wireless power feeder/receiver 100 to the wireless power feeder/receiver 200, the power transmission function section 21 in the power adjustment section 20 is connected selectively by the switching control section 40 in the wireless power feeder/receiver 100, and the power reception function section 22 in the power adjustment section 20 is connected selectively by the switching control section 40 in the wireless power feeder/receiver 200.

Further, in the wireless power feeder/receiver 100, the power feed route is formed selectively by the switching elements 31 and 32 in the switching section 30. For example, the coupling coil 13 and the power transmission function section 21 are connected to each other by the switching element 31. Further, the power feed/receive coil 11 and the power feed/receive capacitor 12 are connected to each other by the switching element 32 and the resonance circuit is formed by the power feed/receive coil 11 and the power feed/receive capacitor 12. In this case, the coupling coil 13 functions as the excitation coil which supplies transmission power output from the power transmission function section 21 to the power feed/receive coil 11.

Similarly, in the wireless power feeder/receiver 200, the power receive route is formed selectively by the switching elements 31 and 32 in the switching section 30. That is, the coupling coil 13 and the power reception function section 22 are connected to each other by the switching element 31. Further, the power feed/receive coil 11 and the power feed/receive capacitor 12 are connected to each other by the switching element 32 and the resonance circuit is formed by the power feed/receive coil 11 and the power feed/receive capacitor 12. In this case, the coupling coil 13 functions as the load coil which obtains AC power received by the power feed/receive coil 11 to output the AC power to the power reception function section 22.

Figure 2:
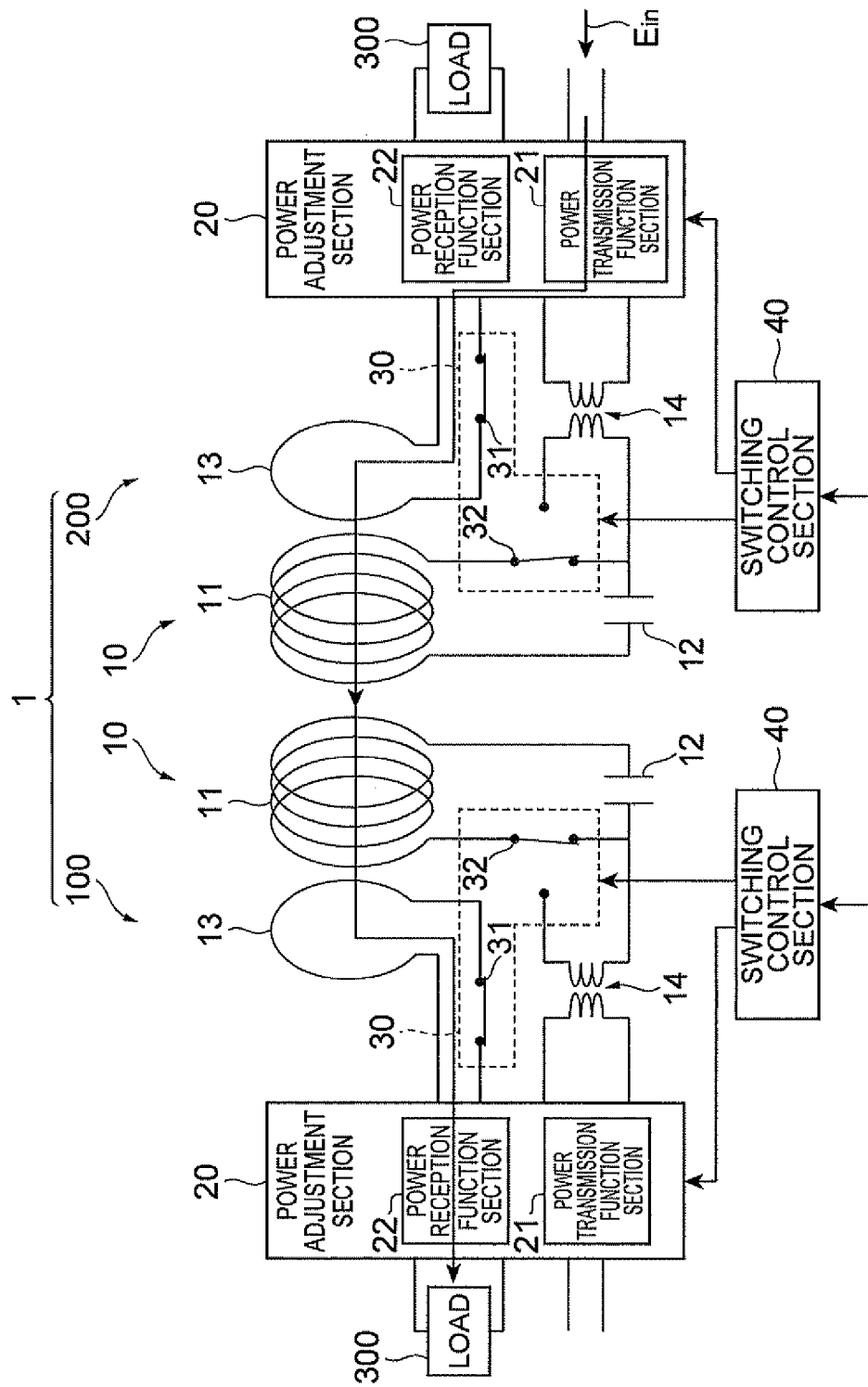
FIG. 2 is a diagram showing an example of a transmission route in a power transmission direction different from that of FIG. 1.

On the other hand, as shown in FIG. 2, when power transmission is performed from the wireless power feeder/receiver 200 to the wireless power feeder/receiver 100, the power transmission function section 21 in the power adjustment section 20 is connected selectively by the switching control section 40 in the wireless power feeder/receiver 200, and the power reception function section 22 in the power adjustment section 20 is connected selectively by the switching control section 40 in the wireless power feeder/receiver 100.

Further, in the wireless power feeder/receiver 200, the power feed route is formed selectively by the switching elements 31 and 32 in the switching section 30. For example, the coupling coil 13 and the power transmission function section 21 are connected to each other by the switching element 31. Further, the power feed/receive coil 11 and the power feed/receive capacitor 12 are connected to each other by the switching element 32 and the resonance circuit is formed by the power feed/receive coil 11 and the power feed/receive capacitor 12. In this case, the coupling coil 13 functions as the excitation coil.

Similarly, in the wireless power feeder/receiver 100, the power receive route is formed selectively by the switching elements 31 and 32 in the switching section 30. That is, the coupling coil 13 and the power reception function section 22 are connected to each other by the switching element 31. Further, the power feed/receive coil 11 and the power feed/receive capacitor 12 are connected to each other by the switching element 32 and the resonance circuit is formed by the power feed/receive coil 11 and the power feed/receive capacitor 12. In this case, the coupling coil 13 functions as the load coil.

In this manner, according to the wireless power feeders/receivers 100, and 200 and the wireless power transmission system 1 of the first embodiment, the power adjustment section 20 causes the wireless power feeder/receiver to function either as a power feeder or as a power receiver, and thereby it is possible to realize bidirectional wireless power transmission by easily switching power feed/receive direction. Thereby, it is possible to easily realize switching between power charging from a house to an electric vehicle and power supply from the electric vehicle to the house. At this time, according to the first embodiment, the coupling coil 13 can be commonly used as the excitation coil and the load coil.

(Switching of the Power Feed Route and the Power Receive Route)

Figure 3:
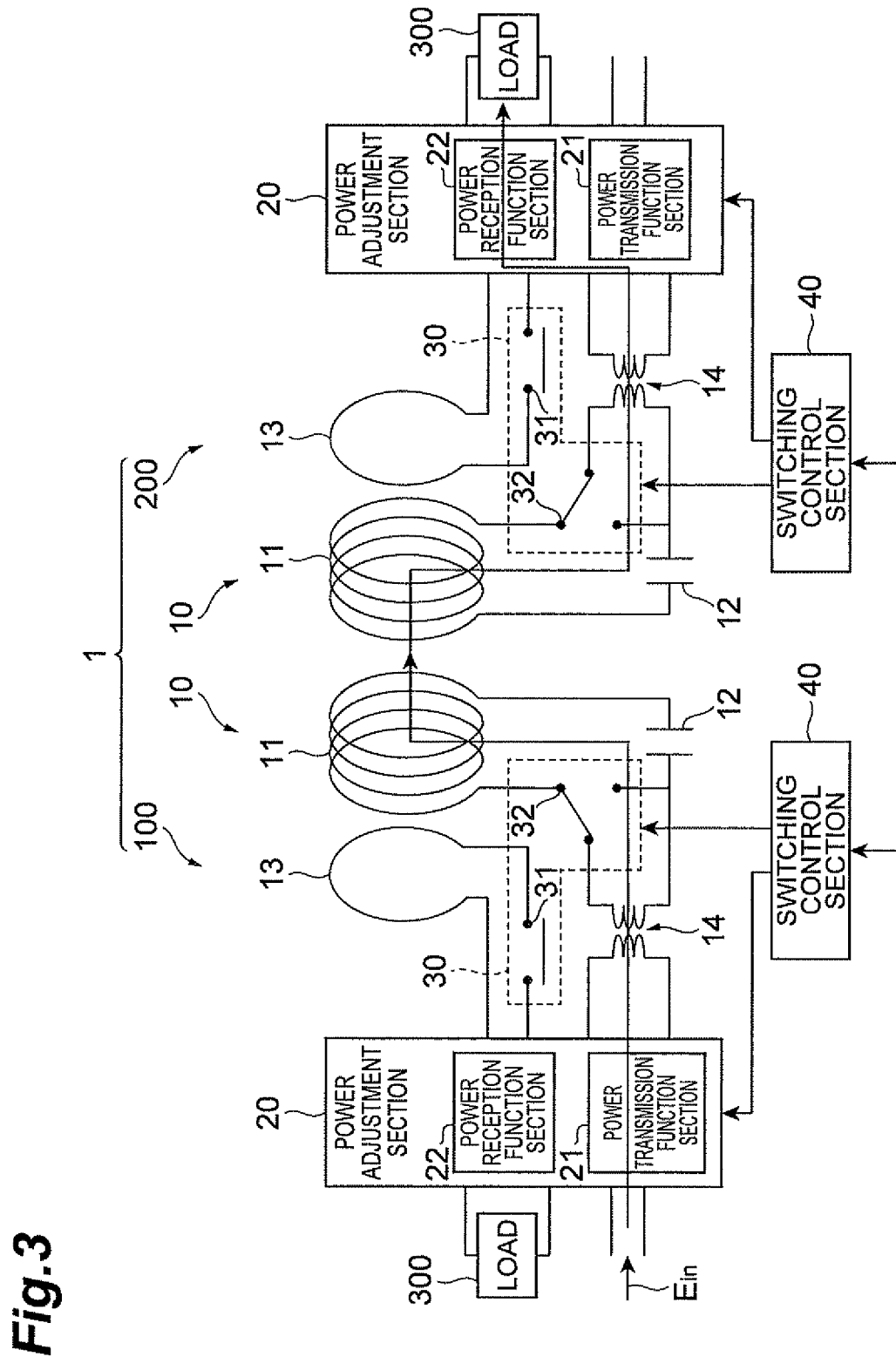
FIG. 3 is a diagram showing an example of another power feed route and power receive route formed by the switching section shown in FIG. 1.

As shown in FIG. 3, in the wireless power feeder/receiver 100, the power feed route can be changed by the switching elements 31 and 32 in the switching section 30. For example, the coupling coil 13 and the power transmission function section 21 are disconnected from each other by the switching element 31 and the resonance circuit configured with the power feed/receive coil 11 and the power feed/receive capacitor 12 is connected to the power transmission function section 21 by the switching element 32.

Similarly, also in the wireless power feeder/receiver 200, the power receive route can be changed by the switching elements 31 and 32 in the switching section 30. For example, the coupling coil 13 and the power reception function section 22 are disconnected from each other by the switching element 31 and the resonance circuit configured with the power feed/receive coil 11 and the power feed/receive capacitor 12 is connected to the power reception function section 22 by the switching element 32.

In this manner, according to the wireless power feeders/receivers 100 and 200 and the wireless power transmission system 1 of the first embodiment, the power feed route is easily changed to the power feed route without utilizing the excitation coil and the power receive route is easily changed to the power receive route without utilizing the load coil. Thereby, it is possible to reduce the power feed loss and the power receive loss due to the power transmission utilizing the electromagnetic induction between the excitation coil and resonance circuit or between the resonance circuit and the load coil.

For example, when power transmission is performed between a base station and an electric vehicle, a relative distance and a transmission power magnitude are expected to be different depending on a kind of the base station, that is, an own house or other facilities. Further, not only normal charging but also high-speed charging is expected to be required. Further, a case in which power transmission is performed from a road or the like to an electric vehicle during driving on the road, and also a case in which power transmission is performed between electric vehicles are expected. In these cases, it is expected that a power transmission distance between the wireless power feeder/receiver 100 and the wireless power feeder/receiver 200 and a transmission power magnitude from the wireless power feeder/receiver 100 to the wireless power feeder/receiver 200 are different depending on a difference between a relative position between the base station and the vehicle which is caused by a vehicle speed and position. According to the first embodiment, it is possible to appropriately switch the power feed route of the power feeder and the power receive route of the power receiver according to various power transmission situations.

In the following, another switching pattern of the power feed route and the power receive route will be illustrated.

Figure 4:
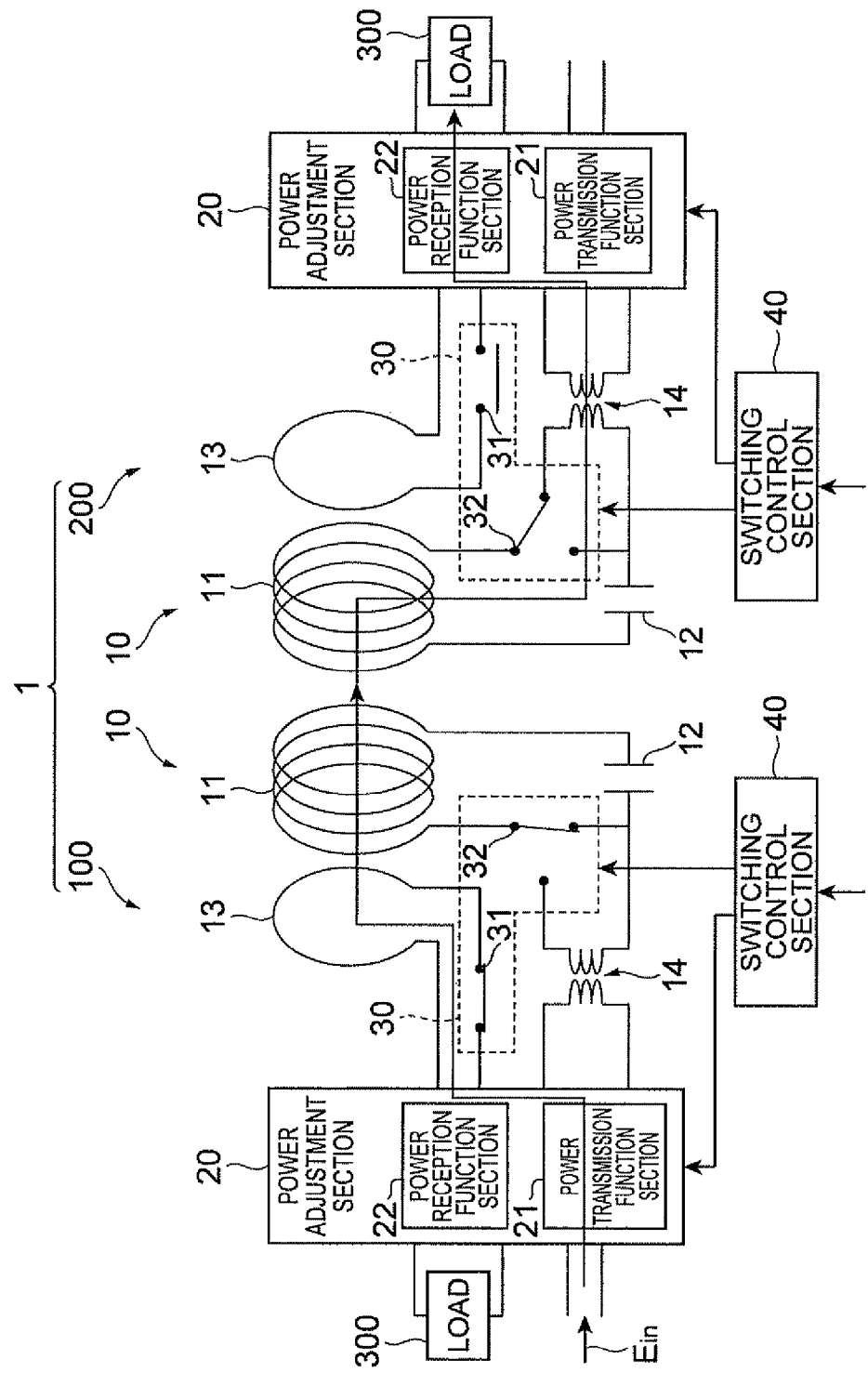
FIG. 4 is a diagram showing an example of another power feed route and power receive route formed by the switching section shown in FIG. 1.
Figure 5:
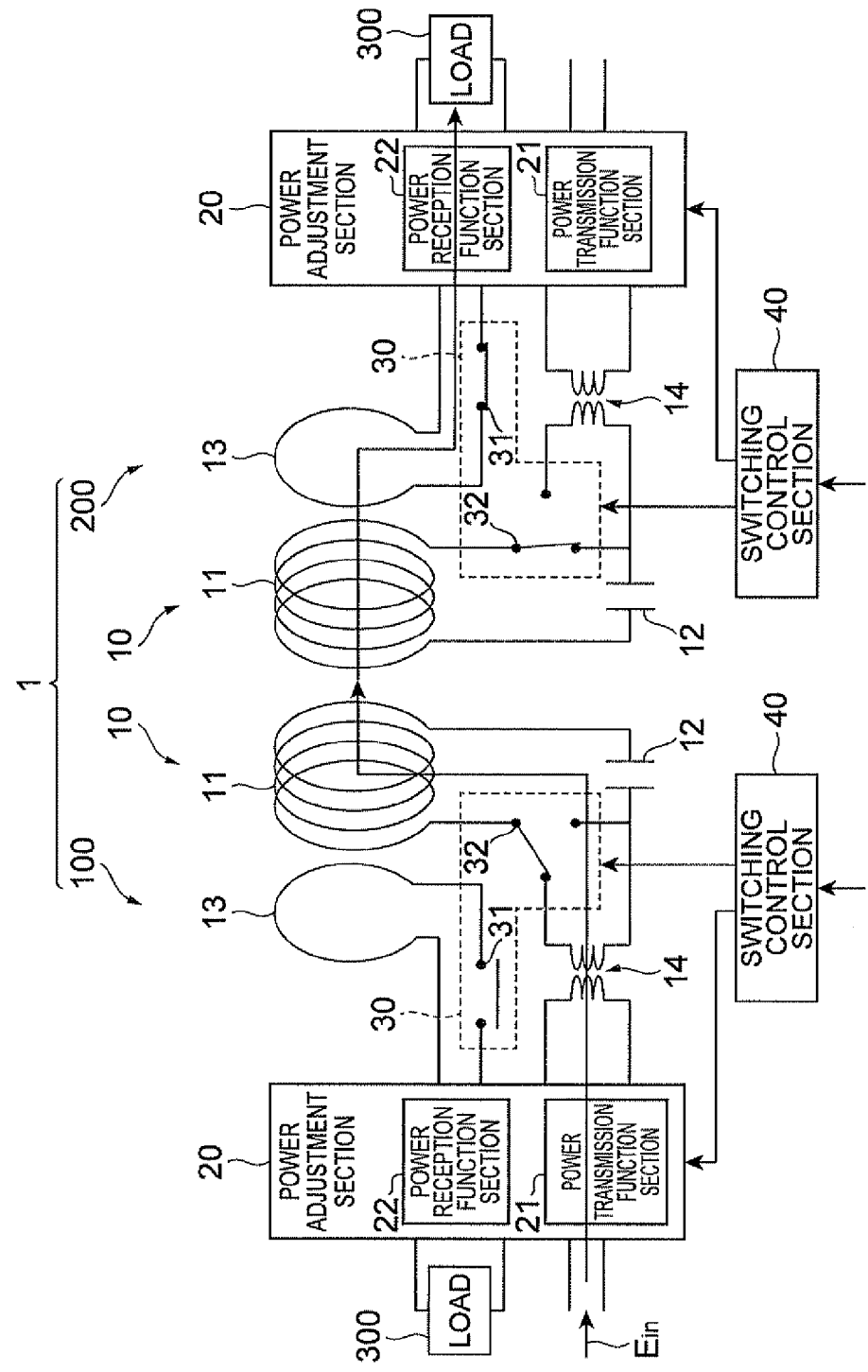
FIG. 5 is a diagram showing an example of another power feed route and power receive route formed by the switching section shown in FIG. 1.

For example, as shown in FIG. 4 and FIG. 5, the power feed route of the power feed side device and the power receive route of the power receive side device may be made different from each other (asymmetric).

According to FIG. 4, in the wireless power feeder/receiver 100, the coupling coil 13 and the power transmission function section 21 are connected to each other by the switching element 31 and the resonance circuit configured with the power feed/receive coil 11 and the power feed/receive capacitor 12 is formed by the switching element 32, for example. On the other side, in the wireless power feeder/receiver 200, the coupling coil 13 and the power reception function section 22 are disconnected from each other by the switching element 31 and the resonance circuit configured with the power feed/receive coil 11 and the power feed/receive capacitor 12 is connected to the power reception function section 22 by the switching element 32, for example.

According to FIG. 5, in the wireless power feeder/receiver 100, the coupling coil 13 and the power transmission function section 21 are disconnected from each other by the switching element 31 and the resonance circuit configured with the power feed/receive coil 11 and the power feed/receive capacitor 12 is connected to the power transmission function section 21 by the switching element 32, for example. On the other side, in the wireless power feeder/receiver 200, the coupling coil 13 and the power reception function section 22 are connected to each other by the switching element 31 and the resonance circuit configured with the power feed/receive coil 11 and the power feed/receive capacitor 12 is formed by the switching element 32, for example.

Figure 6:
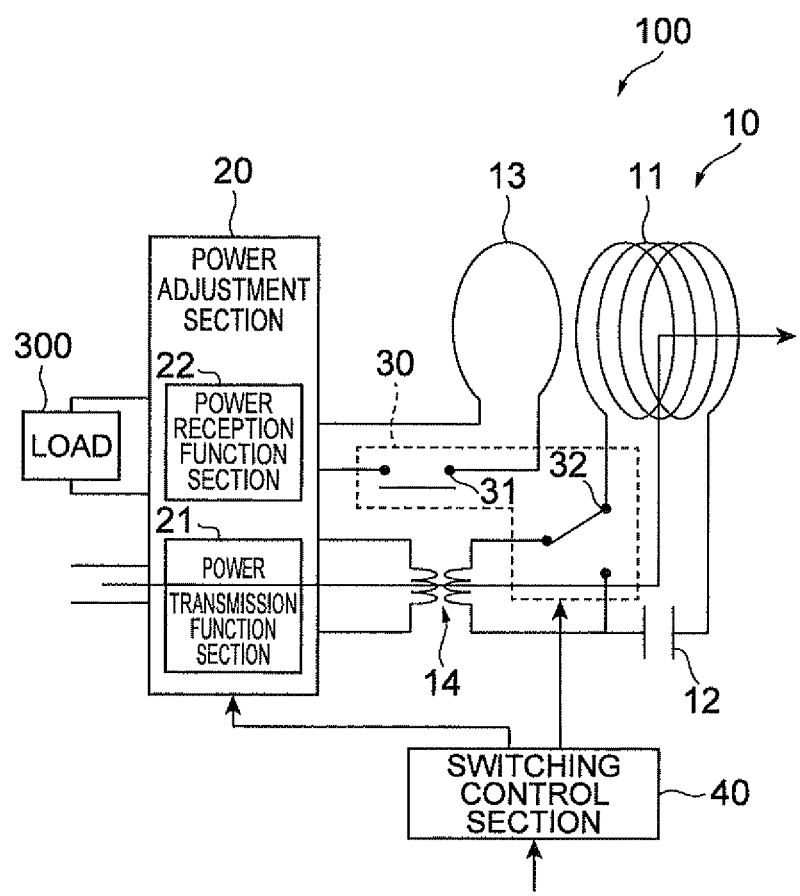
FIG. 6 is a diagram showing an example of a power feed route in a wireless power feeder/receiver alone shown in FIG. 1.
Figure 7:
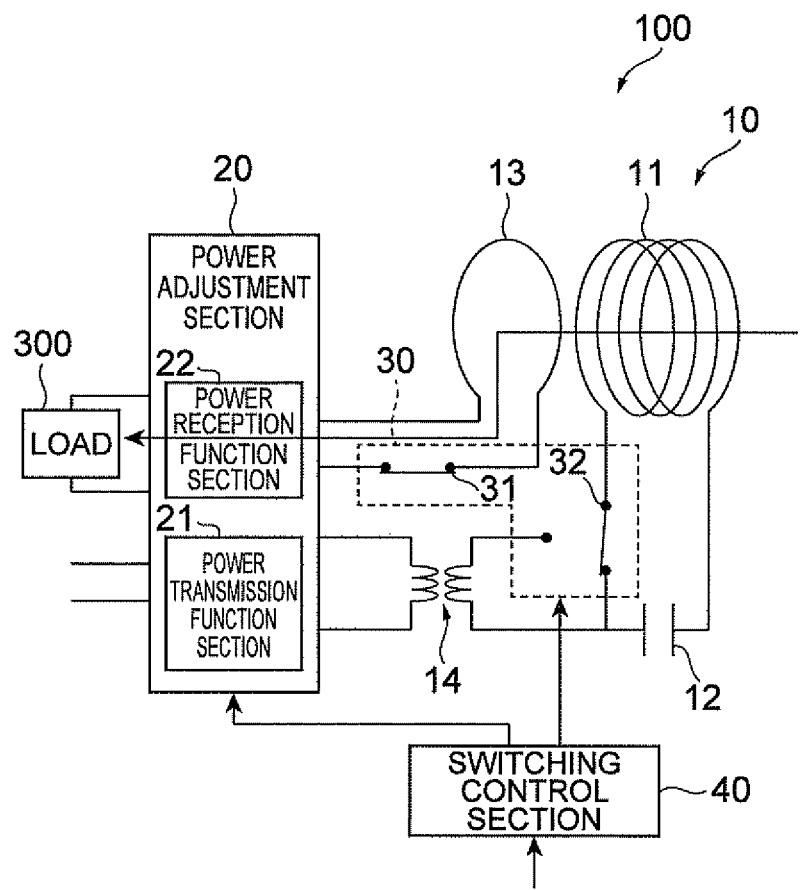
FIG. 7 is a diagram showing an example of a power receive route in a wireless power feeder/receiver alone shown in FIG. 6.

Further, as shown in FIG. 6 and FIG. 7, the power feed route and the power receive route may be made different from each other in one wireless power feeder/receiver, for example.

According to FIG. 6, during power feeding, the coupling coil 13 and the power transmission function section 21 are disconnected from each other by the switching element 31 and the resonance circuit configured with the power feed/receive coil 11 and the power feed/receive capacitor 12 is connected to the power transmission function section 21 by the switching element 32, for example. On the other hand according to FIG. 7, during power receiving, the coupling coil 13 and the power reception function section 22 are connected to each other by the switching element 31 and the resonance circuit configured with the power feed/receive coil 11 and the power feed/receive capacitor 12 is formed by the switching element 32, for example.

Figure 8:
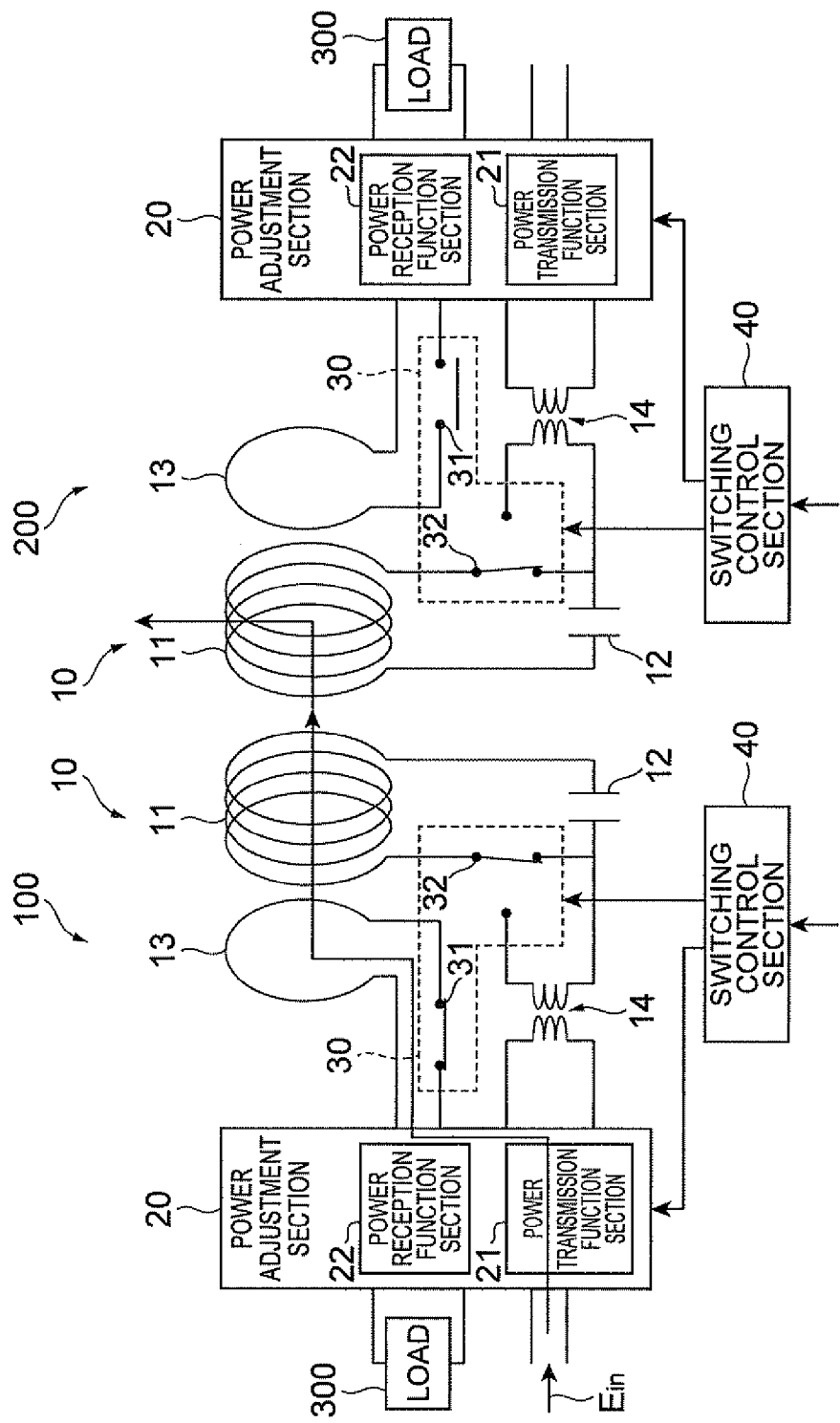
FIG. 8 is a diagram showing an example of a relay route formed by the switching section shown in FIG. 1.

Further, as shown in FIG. 8, the wireless power feeder/receiver of the present embodiment can function as a relay device relaying, so called "Repeater Coil", power to be transmitted from the wireless power feeder/receiver 100 to the wireless power feeder/receiver 200, for example.

According to FIG. 8, in the wireless power feeder/receiver 200, the coupling coil 13 and the power reception function section 22 are disconnected from each other by the switching element 31 and the resonance circuit configured with the power feed/receive coil 11 and the power feed/receive capacitor 12 is formed by the switching element 32, and also this resonance circuit is disconnected from the power reception function section 22, for example.

Second Embodiment

Figure 9:
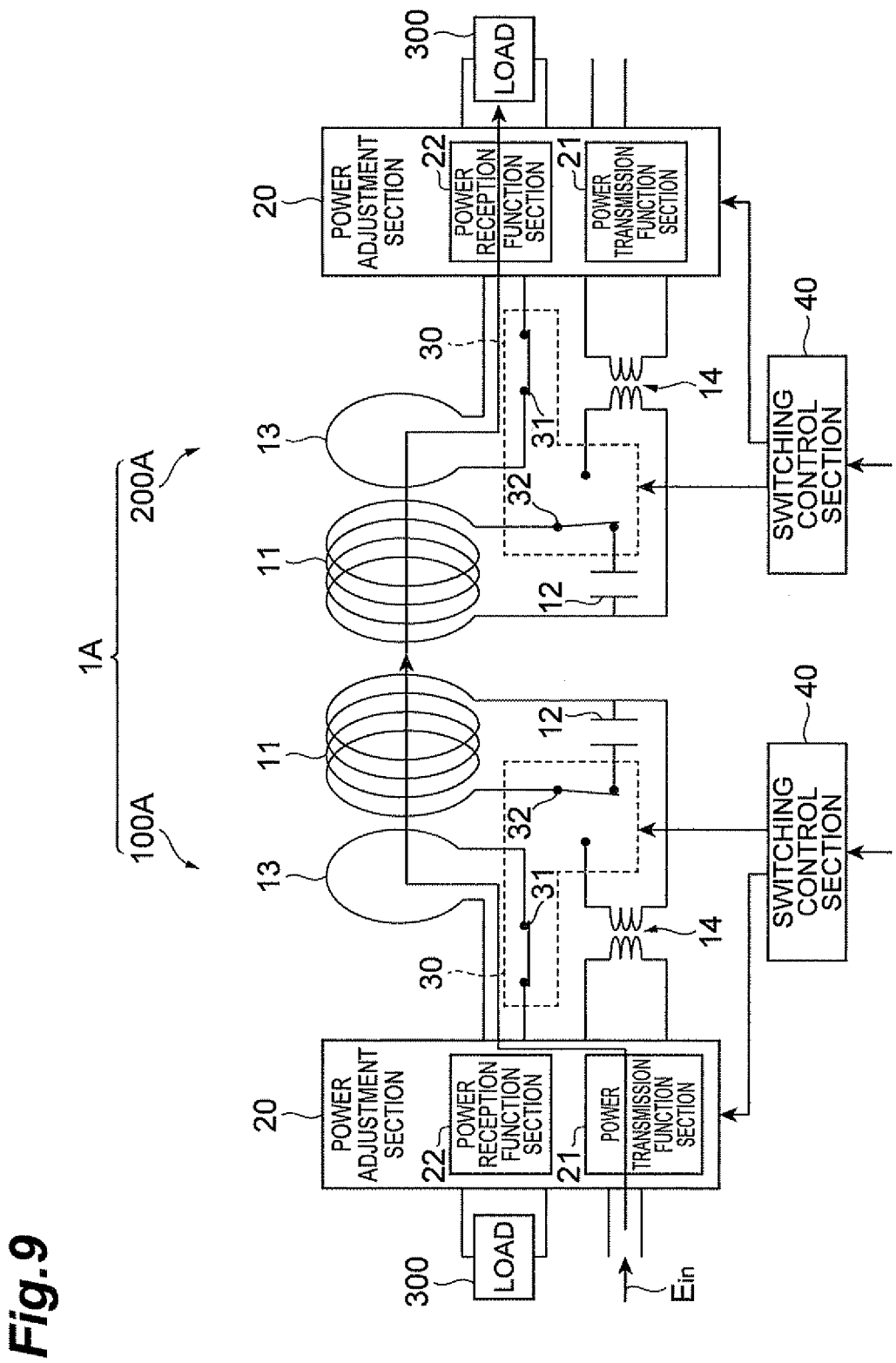
FIG. 9 is a circuit block diagram showing a configuration example of a wireless power transmission system and a wireless power feeder/receiver according to a second embodiment of the present invention.

FIG. 9 is a circuit block diagram showing a configuration example of a wireless power transmission system according to a second embodiment of the present invention. This wireless power transmission system 1A is different from the first embodiment in a configuration in which wireless power feeders/receivers 100A and 200A are provided replacing the wireless power feeders/receivers 100 and 200 in the wireless power transmission system 1, respectively. The wireless power feeders/receivers 100A and 200A have approximately the same configuration and the configuration in one of the wireless power feeders/receivers 100A and 200A will be explained in the following.

The wireless power feeder/receiver 100A is different from the first embodiment in the point that connection of the power feed/receive capacitor 12 is different from that in the wireless power feeder/receiver 100. In other words, while, in the wireless power feeder/receiver 100, the switching element 32 of the switching section 30 electrically connects the resonance circuit configured with the power feed/receive coil 11 and the power feed/receive capacitor 12 directly to the power adjustment section 20 when connecting the power feed/receive coil 11 and the power adjustment section 20 to each other, in the wireless power feeder/receiver 100A, the switching element 32 of the switching section 30 electrically connects only the power feed/receive coil 11 directly to the power adjustment section 20 when connecting the power feed/receive coil 11 and the power adjustment section 20 to each other. That is, when the power feed/receive coil 11 and the power adjustment section 20 are connected to each other, the power feed/receive coil 11 and the power feed/receive capacitor 12 do not configure the resonance circuit and power transmission from the wireless power feeder/receiver 100A is configured to utilize the electromagnetic induction. Other configuration of the wireless power feeder/receiver 100A is the same as that of the wireless power feeder/receiver 100. Note that, while an example in which a switching element is provided only in one line of a parallel wiring is shown also in the present embodiment, a switching element may be provided only in the other line of the parallel wiring or switching elements may be provided in both of the lines, respectively.

As shown in FIG. 9, also in the wireless power feeder/receiver 100A, the power feed route can be formed selectively by the switching elements 31 and 32 in the switching section 30. For example, the coupling coil 13 and the power transmission function section 21 are electrically connected directly to each other by the switching element 31 and the resonance circuit configured with the power feed/receive coil 11 and the power feed/receive capacitor 12 is formed by the switching element 32.

Similarly, also in the wireless power feeder/receiver 200A, the power receive route can be formed selectively by the switching elements 31 and 32 in the switching section 30. For example, the coupling coil 13 and the power reception function section 22 are electrically connected directly to each other by the switching element 31 and the resonance circuit configured with the power feed/receive coil 11 and the power feed/receive capacitor 12 is formed by the switching element 32.

Figure 10:
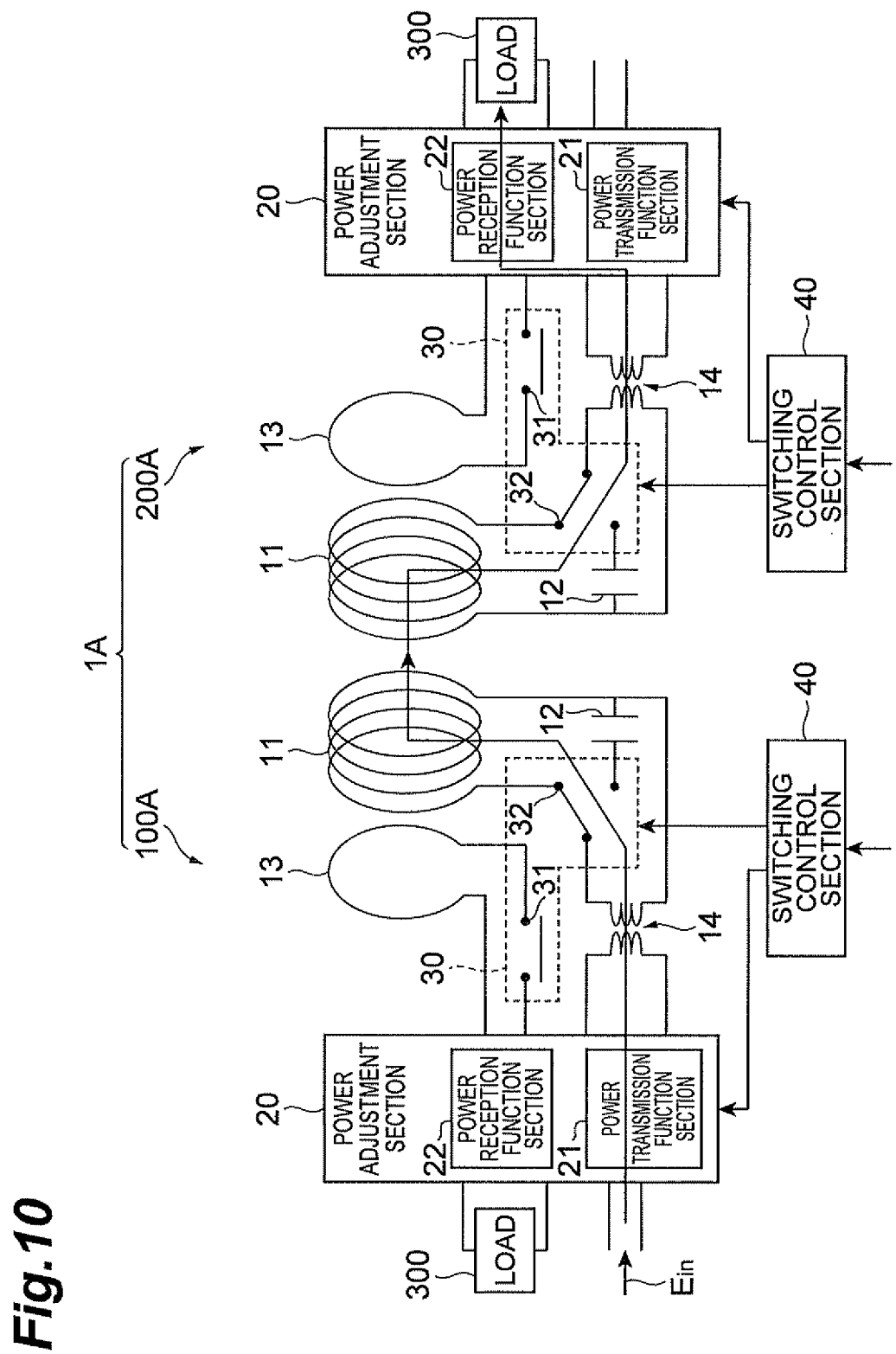
FIG. 10 is a diagram showing an example of another power feed route and power receive route formed by the switching section shown in FIG. 9.

Further, as shown in FIG. 10, also in the wireless power feeder/receiver 100A, the power feed route can be changed selectively by the switching elements 31 and 32 in the switching section 30. For example, the coupling coil 13 and the power transmission function section 21 are electrically disconnected from each other by the switching element 31 and the power feed/receive coil 11 and the power transmission function section 21 are electrically connected directly to each other by the switching element 32, and thereby one end of the power feed/receive capacitor 12 is disconnected and the power feed/receive coil 11 and the power feed/receive capacitor 12 do not form the resonance circuit. That is, the resonance circuit 10 of the wireless power feeder/receiver 100A does not have a resonance frequency near the frequency of AC power output from the power transmission function section 21.

Similarly, also in the wireless power feeder/receiver 200A, the power receive route can be changed selectively by the switching elements 31 and 32 in the switching section 30. For example, the coupling coil 13 and the power reception function section 22 are electrically disconnected from each other by the switching element 31 and the power feed/receive coil 11 and the power reception function section 22 are electrically connected directly to each other by the switching element 32, and thereby one end of the power feed/receive capacitor 12 is disconnected and the power feed/receive coil 11 and the power feed/receive capacitor 12 do not form the resonance circuit. That is, the resonance circuit 10 of the wireless power feeder/receiver 200A does not have a resonance frequency near the frequency of AC power output from the power transmission function section 21.

Also in the wireless power feeders/receivers 100A and 200A and the wireless power transmission system 1A, the same advantage can be obtained as that of the wireless power feeders/receivers 100 and 200 and the wireless power transmission system 1.

Further, according to the second embodiment, it is possible to realize simple bidirectional non-contact power transmission utilizing the electromagnetic induction only by the power feed/receive coil. Further, it is possible to suppress a loss due to the power feed/receive capacitors.

Third Embodiment

Figure 11:
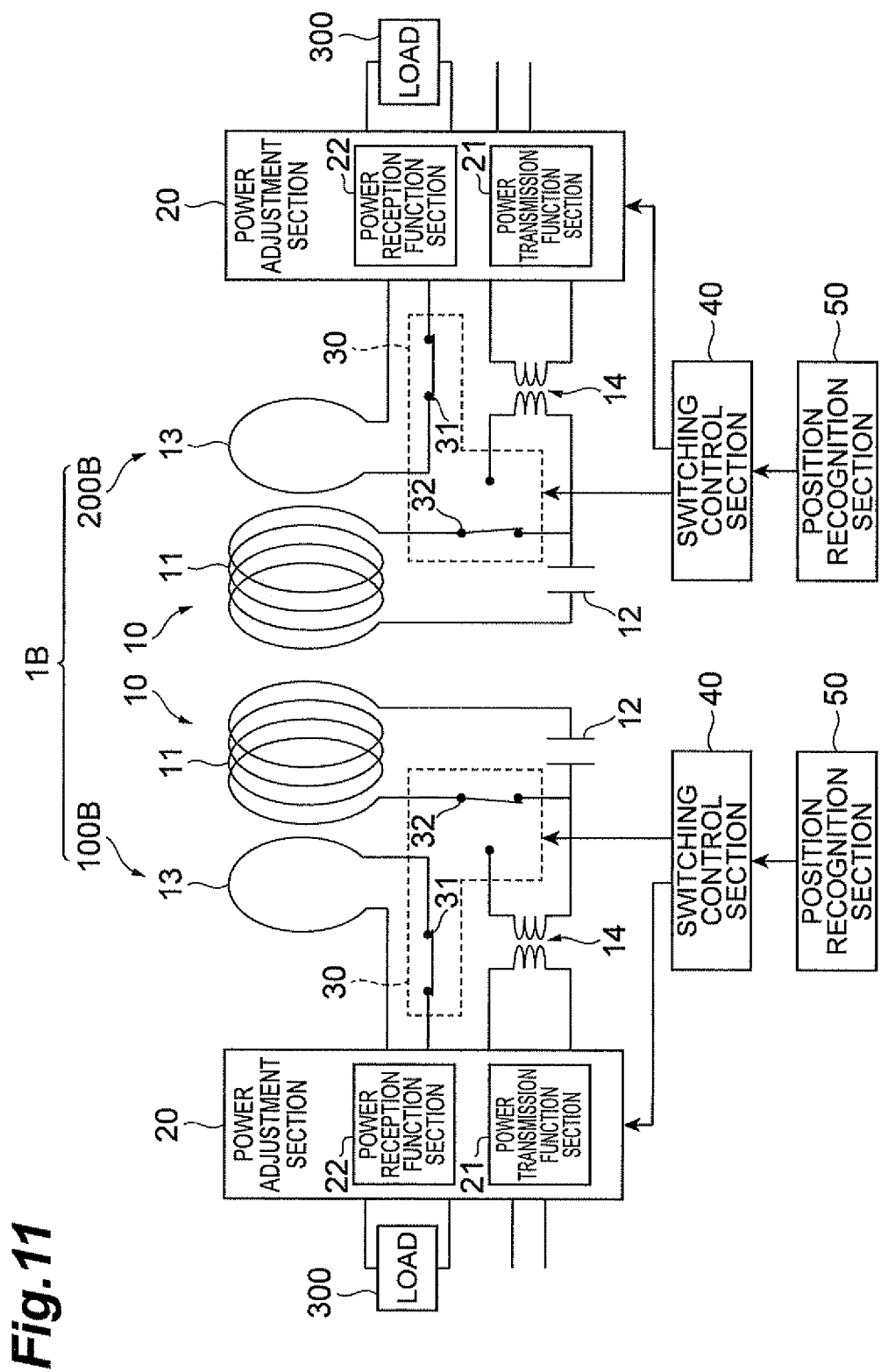
FIG. 11 is a circuit block diagram showing a configuration example of a wireless power transmission system and a wireless power feeder/receiver according to a third embodiment of the present invention.

FIG. 11 is a circuit block diagram showing a configuration example of a wireless power transmission system according to a third embodiment of the present invention. This wireless power transmission system 1B is different from the first embodiment in a configuration in which a wireless power feeders/receivers 100B and 200B are provided replacing the wireless power feeders/receivers 100 and 200 in the wireless power transmission system 1, respectively. The wireless power feeders/receivers 100B and 200B have approximately the same configuration and the configuration in one of the wireless power feeders/receivers 100B and 200B will be explained in the following.

The wireless power feeder/receiver 100B is different from the first embodiment in a configuration in which a position recognition section 50 is further provided in the wireless power feeder/receiver 100. The other configuration of the wireless power feeder/receiver 100B is the same as that of the wireless power feeder/receiver 100.

The position recognition section 50 is a sensor recognizing the position of a power transmission counterpart. For example, the position recognition section 50 recognizes a relative distance to the power transmission counterpart and transmits the information to the switching control section 40.

Then, the switching control section 40 controls the switching section 30 according to the information from the position recognition section 50 and switches the power feed route and the power receive route as described above. For example, the switching control section 40 preliminarily stores setting of the power feed route and the power receive route corresponding to the relative distance to the power transmission counterpart and switches the power feed route and the power receive route according to the corresponding setting.

Also in the wireless power feeder/receivers 100B and 200B and the wireless power transmission system 1B of the third embodiment, the same advantage can be obtained as that of the wireless power feeders/receivers 100 and 200 and the wireless power transmission system 1.

Meanwhile, since the switching control section 40 switches the power feed route and the power receive route according to an external signal, the first embodiment is preferable for a case in which the power feed route and the power receive route are switched according to user's switching operation such as a case of switching between the normal charging and the high speed charging, for example.

On the other hand, in this third embodiment, the switching control section 40 can switch the power feed route or the power receive route appropriately and autonomously according to a relative distance to a power transmission counterpart.

Fourth Embodiment

Figure 12:
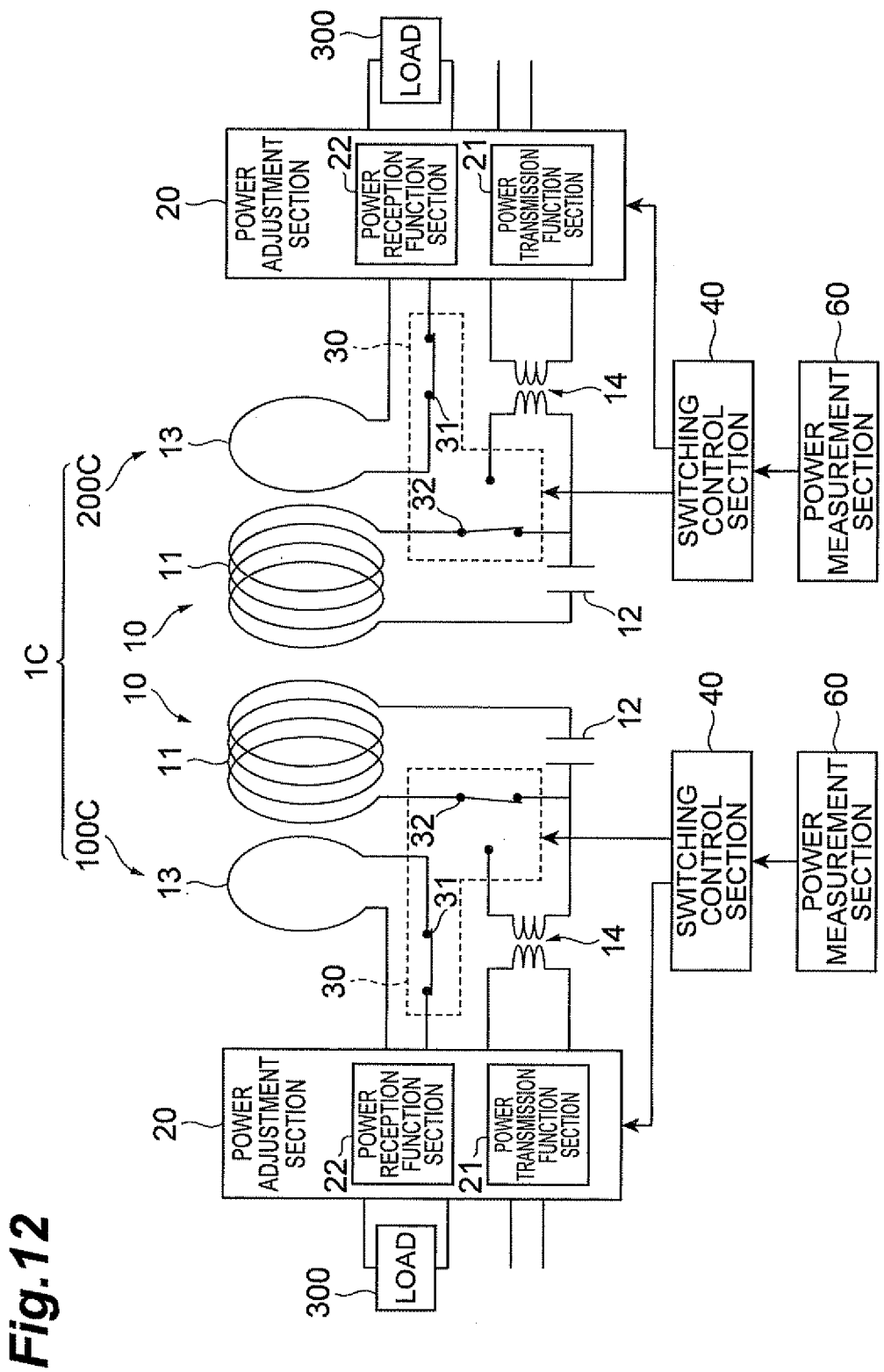
FIG. 12 is a circuit block diagram showing a configuration example of a wireless power transmission system and a wireless power feeder/receiver according to a fourth embodiment of the present invention.

FIG. 12 is a circuit block diagram showing a configuration example of a wireless power transmission system according to a fourth embodiment of the present invention. This wireless power transmission system 1C is different from the first embodiment in a configuration in which wireless power feeders/receivers 100C and 200C are provided replacing the wireless power feeders/receivers 100 and 200 in the wireless power transmission system 1, respectively. The wireless power feeders/receivers 100C and 200C have the same configuration and the configuration in one of the wireless power feeders/receivers 100C and 200C will be explained in the following.

The wireless power feeder/receiver 100C is different from the first embodiment in a configuration in which a power measurement section 60 is further provided in the wireless power feeder/receiver 100. The other configuration of the wireless power feeder/receiver 100C is the same as that of the wireless power feeder/receiver 100.

The power measurement section 60 is a sensor measuring feed power or receive power. For example, the power measurement section 60 transmits information of the measured feed power or receive power to the switching control section 40.

Then, the switching control section 40 controls the switching section 30 according to the information from the power measurement section 60 and switches the power feed route and the power receive route as described above. For example, the switching control section 40 preliminarily stores setting of the power feed route and the power receive route corresponding to the feed power or the receive power and switches the power feed route and the power receive route according to the corresponding setting.

Also in the wireless power feeder/receivers 100C and 200C and the wireless power transmission system 1C of the fourth embodiment, the same advantage can be obtained as that of the wireless power feeders/receivers 100 and 200 and the wireless power transmission system 1.

Further, in this fourth embodiment, the switching control section 40 can switch the power feed route and the power receive route appropriately and autonomously according to the feed power or the receive power.

Note that the present invention is not limited to the above embodiments and can be modified variously. For example, while, in the present embodiments, the switching control section 40 switches the power feed route and the power receive route according to any one of a signal from outside, the position of a power transmission counterpart (i.e., relative distance), and feed power and receive power, the switching control section 40 may switch the power feed route and the power receive route appropriately according to any two or more of the signal from outside, the position of the power transmission counterpart (i.e., relative distance), and the feed power and the receive power.

Further, while, in the present embodiments, the wireless power feeder/receiver capable of bidirectional power transmission is illustrated, the features of the present invention can be applied to a wireless power feeder/receiver including either one of the power feed function and the power receive function. For example, the wireless power transmission system 1 may have a form in which the power adjustment section 20 in one of the wireless power feeder/receiver 100 and the wireless power feeder/receiver 200 includes only the power transmission function section 21 and the power adjustment section 20 in the other one of the wireless power feeder/receiver 100 and the wireless power feeder/receiver 200 includes only the power reception function section 22. Note that the wireless power transmission systems 1A, 1B, and 1C of the second to fourth embodiments can be changed similarly.

Further, the features of the present invention can be applied not only to the power transmission but also to signal transmission. For example, the wireless power transmission system of the present invention can be also applied to a case of transmitting an analog signal or a digital signal by a non-contact method utilizing the magnetic field resonance effect.

Note that the present invention can be applied to a power charging system of a mobile object provided with power storage equipment, for example, an electric vehicle provided with a secondary battery, which power charging system performs bidirectional wireless power transmission to a base station provided with power generation equipment (e.g., house provided with commercial power equipment and solar power equipment, facility provided with commercial power equipment (e.g., gas station), or road) or the mobile object provided with power storage equipment (e.g., electric vehicle (EV) provided with a secondary battery). For example, the present invention can be applied also to an industry-use vehicle or a robot.

Note that, while the element for the magnetic resonance effect is called a "coil" in the present specification, the element sometimes called a "transmitter", "antenna", or the like depending on a related technical field.

While, hereinabove, the principle of the present invention has been explained in the preferable embodiments with reference to the drawings, it is recognized by those skilled in the art that the present invention can be changed in disposition and in detail without departing from such a principle. The present invention is not limited to a specific configuration disclosed in the embodiments. Accordingly, the right is claimed for all the modifications and variations based on the range and the spirit of the claims.

What is claimed is:

1. A wireless power feeder/receiver comprising:
   a power feed/receive coil;
   a power feed/receive capacitor to configure a resonance circuit together with the power feed/receive coil;
   a coupling coil electromagnetically coupled to the power feed/receive coil;
   a power adjustment section performing at least any one of adjustment for AC power to be transmitted from the power feed/receive coil and adjustment for AC power to be received by the power feed/receive coil;
   a switching section switching connection of the power feed/receive coil, the power feed/receive capacitor, and the coupling coil to the power adjustment section, the power feed/receive coil, when being switched to connect with the power adjustment section, being connected to the power adjustment section via a coupling transformer; and
   a switching control section controlling the switching section.

2. A wireless power feeder/receiver comprising:
   a power feed/receive coil;
   a power feed/receive capacitor to configure a resonance circuit together with the power feed/receive coil;
   a coupling coil electromagnetically coupled to the power feed/receive coil;
   a power adjustment section performing at least any one of adjustment for AC power to be transmitted from the power feed/receive coil and adjustment for AC power to be received by the power feed/receive coil;
   a switching section switching connection of the power feed/receive coil, the power feed/receive capacitor, and the coupling coil to the power adjustment section; and
   a switching control section controlling the switching section,
   wherein the switching control section
   controls the switching section so as to connect the coupling coil to the power adjustment section and also to form the resonance circuit by connecting the power feed/receive coil and the power feed/receive capacitor to each other,
   controls the switching section so as to connect the power feed/receive coil to the power adjustment section, or
   controls the switching section so as to form the resonance circuit by connecting the power feed/receive coil and the power feed/receive capacitor to each other without connecting the power feed/receive coil or the coupling coil to the power adjustment section.

3. The wireless power feeder/receiver according to claim 2, wherein
   the switching control section
   controls the switching section so that the power feed/receive coil and the power feed/receive capacitor configure the resonance circuit when connecting the power feed/receive coil to the power adjustment section.

4. The wireless power feeder/receiver according to claim 2, wherein,
   the switching control section
   controls the switching section so that the power feed/receive coil and the power feed/receive capacitor do not configure the resonance circuit when connecting the power feed/receive coil to the power adjustment section.

5. The wireless power feeder/receiver according to claim 1, wherein,
   the switching control section controls the switching section according to a user switching operation.

6. The wireless power feeder/receiver according to claim 1, further comprising a position recognition section recognizing a position of a power feed/receive counterpart, wherein
   the switching control section controls the switching section according to the position recognized by the position recognition section.

7. The wireless power feeder/receiver according to claim 1, further comprising
   a power measurement section measuring feed/receive power, wherein
   the switching control section controls the switching section according to the feed/receive power measured by the power measurement section.

8. A wireless power transmission system comprising
   at least two wireless power feeders/receivers according to claim 1, wherein
   bidirectional power transmission is performed between these wireless power feeders/receivers by a non-contact method.

9. The wireless power feeder/receiver according to claim 2, wherein,
   the switching control section controls the switching section according to a user switching operation.

10. The wireless power feeder/receiver according to claim 3, wherein,
    the switching control section controls the switching section according to a user switching operation.

11. The wireless power feeder/receiver according to claim 4, wherein,
    the switching control section controls the switching section according to a user switching operation.

12. The wireless power feeder/receiver according to claim 2, further comprising a position recognition section recognizing a position of a power feed/receive counterpart, wherein
    the switching control section controls the switching section according to the position recognized by the position recognition section.

13. The wireless power feeder/receiver according claim 3, further comprising a position recognition section recognizing a position of a power feed/receive counterpart, wherein the switching control section controls the switching section according to the position recognized by the position recognition section.

14. The wireless power feeder/receiver according to claim 4, further comprising a position recognition section recognizing a position of a power feed/receive counterpart, wherein
the switching control section controls the switching section according to the position recognized by the position recognition section.

15. The wireless power feeder/receiver according to claim 2, further comprising
a power measurement section measuring feed/receive power, wherein
the switching control section controls the switching section according to the feed/receive power measured by the power measurement section.

16. The wireless power feeder/receiver according to claim 3, further comprising
a power measurement section measuring feed/receive power, wherein
the switching control section controls the switching section according to the feed/receive power measured by the power measurement section.

17. The wireless power feeder/receiver according to claim 4 further comprising
a power measurement section measuring feed/receive power, wherein
the switching control section controls the switching section according to the feed/receive power measured by the power measurement section.

* * * * *